Patented Mar. 9, 1954

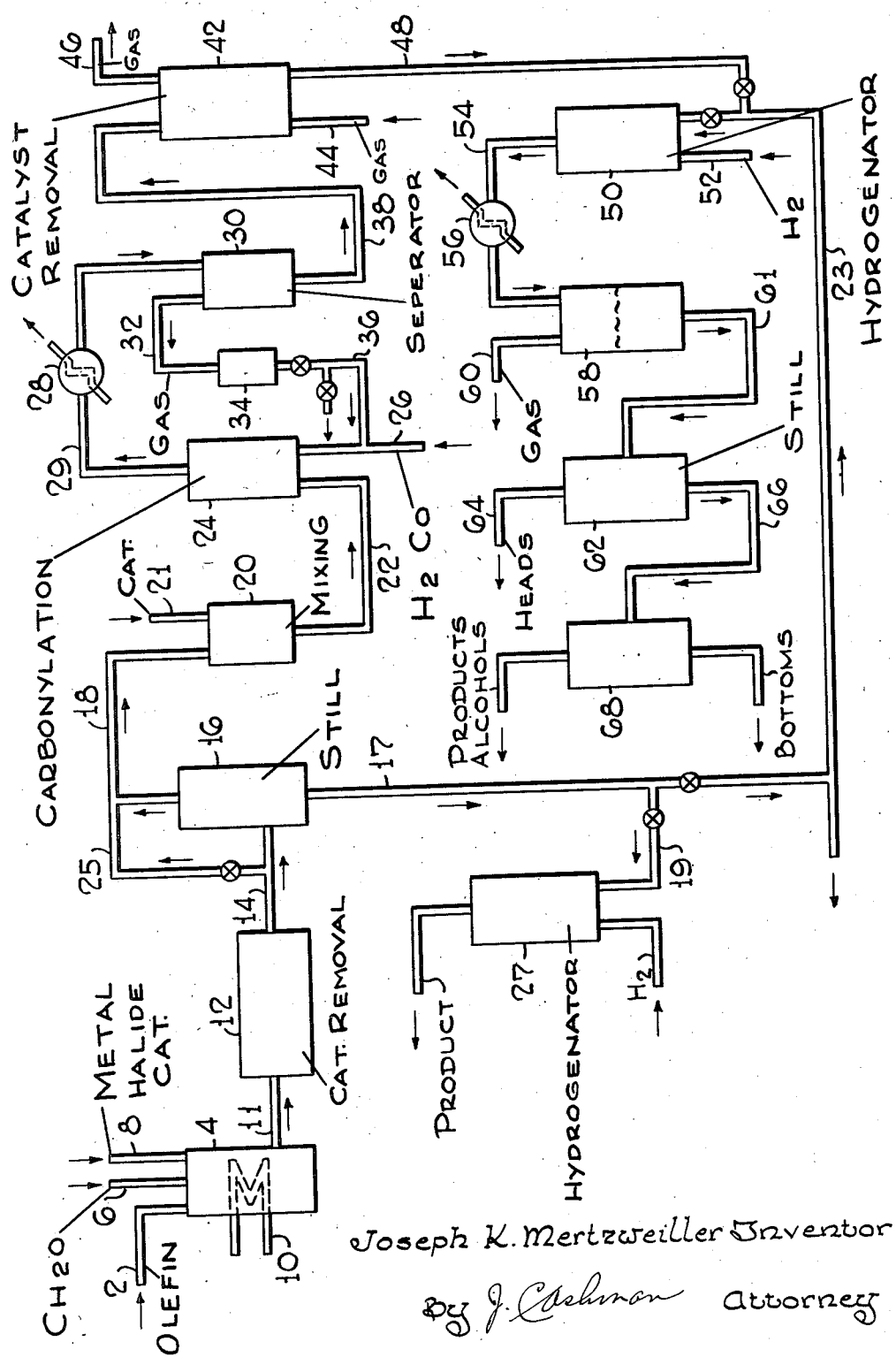

2,671,814

UNITED STATES PATENT OFFICE 2,671,814

ALCOHOL SYNTHESIS PROCESS

Joseph K. Mertzweiller, Baton Rouge, La., assignor to Standard Oil Development Company, a corporation of Delaware Application November 10, 1950, Serial No. 195,109

8 Claims. (Cl. 260—638)

The present invention relates to an improved synthesis process for the production of alcohols by reacting organic compounds having olefinic linkages with gas mixtures containing CO and $H_2$ at high pressures and elevated temperatures in the presence of suitable catalysts. More particularly, the invention is concerned with an improved process for producing alcohols from olefinic feed stocks which normally undergo the carbonylation reaction with difficulty.

The synthesis of oxygenated organic compounds from olefinic compounds and mixtures of CO and $H_2$ is now well known in the art. The olefinic starting material is reacted in the liquid state with CO and $H_2$ in the presence of a group VIII metal catalyst, usually cobalt. The primary reaction product consists essentially of organic carbonyl compounds, mainly aldehydes, having one more carbon atom more per molecule than the olefinic feed material. The oxygenated product may then be hydrogenated in a second catalytic stage to convert the aldehydes to the corresponding alcohols.

Suggested as starting materials, have been practically all types of organic compounds having an olefinic double bond, including aliphatic olefins and diolefins, cyclo-olefins, aromatics with olefinic side chains, oxygenated organic compounds with olefinic double bonds, and the like. The metal may be present as a solid or in the form of a compound soluble in the olefinic feed stock. Suitable reaction conditions include temperatures of about 150°–450° F., pressures of 100–300 and higher atmospheres, $H_2$ to CO ratios of about 0.5–2:1, liquid feed rates of about 0.1 to 5.0 v./v./hr. and gas feed rates of about 1000–45,000 standard cubic feet of gas mixture per barrel of liquid olefin feed.

Similar or higher temperatures and pressures, and hydrogenation catalysts such as nickel, copper, tungsten, oxides or sulfides of group VI and group VIII metals, etc. may be employed in the second stage for hydrogenation of the carbonyl compounds to alcohols.

It has, however, been found that certain olefins are considerably less adaptable to the alcohol synthesis process than others, and that, for a given olefin, one isomer may give an aldehyde and an alcohol yield of over 90%, another isomer of the same olefin may give a negligible yield of aldehyde and alcohol. These differences may be attributed to steric effects. Thus straight chain alpha olefins are usually found to give the highest yield of reaction products, whereas tri- and tetra-substituted olefins are highly resistant to reaction, and limit the conversion obtained in the synthesis reaction. This problem becomes particularly acute when the olefinic feed is not a pure compound but a mixture of isomers boiling within a relatively narrow range and consisting of isomeric olefins of the same molecular weight. This is, of course, true in most commercial operations wherein it is not feasible to isolate pure compounds.

For instance, in the process of manufacturing octyl alcohols from heptene on a commercial scale, an abundant source of heptene is available from the controlled polymerization, in the presence of a phosphoric acid catalyst, of a mixture of butylenes and propylene, available in practically unlimited supply in petroleum refineries. The polymer is distilled and the heptene fraction is isolated. As would be expected, the product is a mixture of isomeric heptenes. It is convenient to classify olefinic types in the following manner, depending upon the hydrogen loading of the olefinic carbons.

| Type | | Example |
|---|---|---|
| I | Primary | $R-CH=CH_2$ |
| II | Secondary | $R-CH=CH-R$ |
| III | Tertiary | $\begin{array}{c}R\\ \phantom{R}\diagdown\\ \phantom{RR}C=CH_2\\ \phantom{R}\diagup\\ R\end{array}$ |
| IV | ----do----- | $\begin{array}{c}R\\ \phantom{R}\diagdown\\ \phantom{RR}C=CHR\\ \phantom{R}\diagup\\ R\end{array}$ |
| V | ----do----- | $\begin{array}{c}R\phantom{RRR}R\\ \phantom{R}\diagdown\phantom{R}\diagup\\ \phantom{RR}C=C\\ \phantom{R}\diagup\phantom{R}\diagdown\\ R\phantom{RRR}R\end{array}$ |

An analysis of a typical heptene polymer fraction boiling in the range of about 168° to 210° F., shows an olefin type distribution as follows:

| Type | Weight, percent |
|---|---|
| I | 1 |
| II | 12 |
| III | 12 |
| IV | 55 |
| V | 20 |

It is thus seen that a preponderant fraction of the heptenes is present as tertiary olefins. Now though tertiary olefins of type III are quite reactive in the carbonylation reaction, others, particularly those represented by group V, react very slowly or not at all. For example, 2,3-di-methyl pentene-2 reacts with CO and $H_2$ to form aldehydes at a substantially slower rate that it reacts with $H_2$ alone to form the saturated paraffin. The presence, particularly of the type V type of olefin in the feed to the primary carbonylation reactor puts a large burden on the final distillation section and cuts down materially the plant capacity, for either the olefins are recovered unchanged or as paraffins, both of which are undesired in a process where the primary purpose is to synthesize aldehydes and alcohols, giving as a final result, low overall conversions of olefin.

It is, therefore, the principal purpose of the present invention to utilize more completely the olefin content of a feed to the alcohol synthesis process and to obtain high olefin conversions.

It is also a purpose of the present invention to prepare a feed for the carbonylation reaction containing substantially less type V (tetrasubstituted) olefins from polymers than has hitherto been possible, without resorting to expensive and difficult refractionation methods.

A further purpose of the present invention is to prepare a superior alcohol more suitable for employment as intermediate in the manufacture of plasticizers and detergents.

Other purposes and advantages of the invention will become apparent hereinafter.

The present invention overcomes these difficulties and affords various additional advantages. These advantages, the nature of the invention, and the manner in which it is carried out will be fully understood from the following description thereof read with reference to the accompanying drawing which shows a semi-diagrammatic view of apparatus adapted to carry out the invention.

In accordance with the present invention, the feed to the alcohol synthesis process is first reacted with formaldehyde at partial olefin conversion level, followed by treating the reaction product with CO and $H_2$ to complete the olefin conversion. Under controlled conditions, as detailed below, the reaction between olefins and formaldehyde may be controlled to be specific for tertiary olefins. The reaction products are principally unsaturated alcohols and meta-dioxanes which, on hydrogenation, yield alcohols substantially isomeric with the alcohols obtained as end product from the alcohol synthesis reaction.

In one embodiment of the present invention, a feed to the synthesis process wherein the type V olefin content is minimized is prepared by treating an olefin feed fraction containing various tertiary olefinic compounds with formaldehyde in the presence of a catalyst such as sulfuric acid or anhydrous stannic chloride, or at elevated temperatures without a catalyst, subjecting the product to distillation to remove olefins from oxygenated material, which is easily accomplished, and subjecting the olefins to the alcohol synthesis reaction with CO and $H_2$, followed by hydrogenation of the aldehydes thus formed. The formaldehyde reaction products may be hydrogenated separately or, under certain conditions, it may be desirable to combine as the feed to the hydrogenation unit the aldehydes as well as the formaldehyde product.

In another embodiment of the invention, total product from the formaldehyde treatment is employed as feed to the alcohol synthesis reactor. With the combination of the two types of alcohol synthesis reactors, more complete and selective overall conversion of olefins is accomplished than could be achieved with either reaction carried out individually. Thus, olefin hydrogenation is minimized and maximum formaldehyde utilization is realized when excess olefin is present, which is conveniently maintained without the expense of recycling in a partial conversion operation. Thus, depending upon the constitution of the olefins, a final product is obtained either mixed with or without, alcohols derived from the reaction of formaldehyde with tertiary olefins, which last-named alcohols are isomeric with the aldehyde-derived alcohols.

Having set forth the general nature, the invention will best be understood from the following more detailed description in which reference will be made to the accompanying drawing.

Referring now in detail to the figure, the system illustrated therein essentially comprises a formaldehyde pretreating unit 4, carbonylation reactor 24, decobalting vessel 42 and hydrogenator 50, whose function and cooperation will be explained below, using the treatment of a propylene-butylene polymer fraction boiling in the range of about 168° to 210° F. and consisting essentially of heptenes as an example. It is understood that the process is applicable in substantially analogous manner to the treatment of other mixtures or olefin streams, providing that such mixtures contain tertiary olefins.

In operation, a heptene fraction boiling in the range of about 168° to 210° F. and prepared by the polymerization of propylene and butylenes in the presence of a phosphoric acid catalyst is passed through line 2 into agitator 4. At the same time an amount of trioxymethylene, in molar proportions about equivalent to the tertiary olefins present in the feed, is added through line 6. The types of olefins present in the feed may readily be determined by infra-red or spectrographic analysis. Catalyst, such as stannic chloride, is admitted through line 8. About 0.05 to 0.5 mols catalyst per mol trioxymethylene is desirable. The resulting slurry is vigorously agitated, cooling being provided by coil 10. It is desirable that the temperature should not rise above about 80° F. The reaction mixture, after a residence period of about 5 to 20 hours, is passed through line 11 to processing equipment 12, wherein the material is washed, treated with soda to remove excess catalyst, and filtered, all in a manner known per se. The condensation product, comprising essentially, $C_8$ unsaturated primary alcohols, and the unreacted material is passed via line 14 to still 16, wherein the product is fractionated. The unreacted heptenes are removed as overhead through line 18, and the bottoms product, containing the tertiary olefin-formaldehyde condensate, is treated as described subsequently.

The overhead from still 16, composed essentially of primary and secondary olefins admixed with some tertiary olefins, but containing substantially less than the original olefin feed, is mixed in mixing chamber 20 with 1-3% of a catalyst promoting the reaction between olefins and $H_2$ and CO introduced into mixing chamber 20 through line 21. Hydrocarbon-soluble soaps such as cobalt stearate, oleate, or naphthenate and the like, may be employed. The solution of catalyst in olefin is passed to the lower portion of primary reactor 24 through line 22.

Simultaneously, a gas mixture containing hydrogen and carbon monoxide in the approximate ratio of 0.5–2 volumes of $H_2$ per volume CO is supplied through line 26. Reactor 24 is preferably operated at about 3000 p. s. i. g. and at a temperature of from about 250°–400° F. The reactor may contain no packing, or may be packed with a catalytically solid material, such as ceramic Raschig rings, pumice, and the like.

Liquid oxygenated reaction products, unreacted olefins, and synthesis gases are withdrawn from the top of the high pressure reactor 24 and are transferred through line 29 and cooler 28 to high pressure separator 30 where unreacted gases are withdrawn overhead through line 32, scrubbed in scrubber 34 of entrained metal carbonyl catalyst and may be recycled through line 36 to reactor 24 or used as required in other parts of the system.

Liquid products are withdrawn through line 38 from high pressure separator 30 and passed to catalyst removal zone 42 which may be a vessel packed with inert solid material of a nature similar to that in primary reactor 24 or may also contain no packing. Hydrogen-comprising gases recovered from another stage of the process may be supplied to catalyst removal zone 42 through line 44 and passed through zone 42 countercurrently to the liquid oxygenated product. Catalyst removal zone 42 is preferably maintained at a temperature of about 200° to 450° F., at which temperature the catalyst which enters zone 42 predominantly in the form of metal carbonyl, such as cobalt carbonyl, dissolved in the liquid product is decomposed into metal and carbon monoxide. The metal may be deposited on the inert packing within zone 42 or on the walls, while the carbon monoxide may be purged by the hydrogen. A mixture of hydrogen and carbon monoxide may be withdrawn through line 46 and sent to a methanizer or other suitable catalytic unit, wherein carbon monoxide may be converted into methane in any conventional manner, or the purge gas mixture may be used directly in hydrogenator 50 if a CO-insensitive hydrogenation catalyst such as the sulfactive catalysts, as sulfides of molybdenum, tungsten, etc. is employed as hydrogenation catalyst.

Liquid oxygenated products now substantially free of carbonylation catalysts are withdrawn from catalyst removal zone 42 through line 48 and passed to the lower portion of hydrogenation reactor 50. Simultaneously hydrogen is supplied to reactor 50 through line 52 in proportions sufficient to convert the organic carbonyl compounds in the oxygenated feed into the corresponding alcohols. Hydrogenator 50 may contain a mass of any conventional hydrogenation catalyst, for example, nickel, copper chromite, sulfactive hydrogenation catalysts such as tungsten sulfide, nickel sulfide, molybdenum sulfide, and the like. Depending upon the catalyst, reactor 50 may be operated at pressures ranging from 3000 to 4500 p. s. i. g. and at temperatures of from about 300° to 500° F. and an $H_2$ rate of from about 5000 to 20,000 normal cu. ft. per bbl. of feed. The catalyst may be in the form of fixed or moving beds, or suspended in the liquid feed.

The products of the hydrogenation reaction and unreacted hydrogen may be withdrawn overhead through line 54 from reactor 50 then through cooler 56 into high pressure separator 58. Unreacted hydrogen may be withdrawn overhead from separator 58 through line 60 and either vented or recycled to the hydrogenation reactor. The liquid products are withdrawn from separator 58 through line 61 to hydrocarbon still 62, wherein are distilled overhead low-boiling products, mostly hydrocarbons boiling below the alcohol product desired. Thus when a $C_7$ olefin fraction is the feed to the process, generally the product boiling up to 340° F. is removed as a heads cut in hydrocarbon still 62, and this material is withdrawn overhead through line 64 and may be used as a gasoline blending agent if desired. The bottoms from this primary distillation are withdrawn from hydrocarbon still 62 through line 66 and sent to alcohol still 68 where the product alcohols boiling in the desired range may be removed overhead by distillation at atmospheric pressures or under partial vacuum, depending upon the molecular weight of the alcohols.

Returning now to the bottoms product in still 16, the latter are withdrawn through 17 for further processing. Though olefins may be condensed with formaldehyde in a variety of ways, this condensation in the presence of inorganic metal halide catalyst of the type of stannic chloride, zinc chloride, silicon tetrachloride, etc. yields preferentially unsaturated alcohols with one more carbon atom in the molecule than the olefin from which it derives. These alcohols may, if desired, be isolated for utilization as solvents, etc. Preferably, however, they may be reduced to the corresponding saturated alcohols either separately, or they may, under certain circumstances, be hydrogenated together with the decobalted product from 42. Thus product withdrawn through line 17 may be passed to a separate hydrogenation oven 27 via line 19 or it may be passed, in whole or in part, through line 23 for hydrogenation in hydrogenator 50, thus adding substantially to the overall yield of primary octyl alcohols.

The process of the invention may be subject to numerous modifications. Thus, as has been indicated above, under some circumstances, it may be desirable to pass the entire formaldehyde reaction product, after separation of the inorganic salts, said product including the unsaturated alcohols and the unreacted olefins, to the carbonylation reaction. Inasmuch as the unsaturated alcohols formed in reactor 4 are also tertiary olefinic alcohols, these olefins do not undergo except to a very minor extent, the carbonylation reaction with $H_2$ and CO. Thus, total product from 12 may be passed via lines 14 and 25 to catalyst mixing unit 20 and thence passed to the carbonylation reactor 24, and a final yield of alcohol product is thus obtained considerably higher than if the original olefin had not been pretreated with formaldehyde or its polymers. Thus, instead of trioxymethylene, gaseous formaldehyde, para-formaldehyde, or compounds which decompose to yield formaldehyde may be employed. It does not go to the heart of the present invention to disclose a process for reacting formaldehyde with olefins; rather it is the purpose and object to disclose a novel combination including the formaldehyde processing step to increase alcohol yields and reactor capacities.

The invention may be further illustrated by the following specific examples, which clearly indicate the advantages obtainable from operating in accordance with the present invention.

*Example I*

392 grams (4.0 mols) of dry heptene fraction prepared by polymerizing propylene in the presence of butylene and a phosphoric acid catalyst, and in addition, 360 grams (4.0 mols) of trioxymethylene were placed in a 2-liter flask fitted with a mechanical stirrer and a calcium chloride tube. After stirring was commenced, 38 grams (0.25 mol) of anhydrous stannic chloride was added; cooling with wet ice was employed to keep the temperature as near as possible to 80° F., though a maximum of 120° F. was reached during a very short interval. Stirring was continued for 20 hours and the product filtered to remove excess trioxymethylene. The filtered product was treated with 10% sodium carbonate solution until the aqueous layer was alkaline and no further precipitate formed. The tin carbonate was removed by filtration, the layers separated and the organic layer washed twice with distilled water and dried over anhydrous sodium sulfate. Recovered was 370.7 grams (94.5%) material having an API gravity of 46.2°. In this operation 39 mol percent of the feed was converted.

The crude product was distilled on a 25 mm. Pod. column at atmospheric pressure and 5/1 reflux ratio, the following fractions being taken:

| | Weight percent |
|---|---|
| In—195° F. (350° F. liquid temperature) | 53.06 |
| Bottoms | 43.28 |
| Water | 3.66 |

The unreacted hydrocarbon and olefin feed were subjected to olefin type analysis, with the following results:

| Type | Feed | Product |
|---|---|---|
| I | 1 | 2 |
| II | 12 | 17 |
| III | 12 | 9 |
| IV | 55 | 61 |
| V | 20 | 11 |

The above data indicate that there has been a distinct decrease in the tertiary olefins from the amount originally present in the feed. Especially, it is to be noted that the type V olefin content, namely, that type of olefin wherein the olefinic carbon atoms are attached to carbon atoms rather than to hydrogen, has been decreased to almost 50% of its former value. These tetra substituted olefins are extremely resistant to reaction with carbon monoxide and hydrogen in the presence of a cobalt carbonylation catalyst and their removal and conversion in accordance with the present invention increases to a substantial extent, the capacity of the reactors.

Example II

This run was made with 12 mols of the heptene polymer, 4 mols of trioxymethylene and 0.75 mol of anhydrous stannic chloride. Conditions were similar to those in Example I, stirring being continued for 22 hours. The recovered product amounted to and had an API gravity of 46.9°. The following fractions were segregated by distillation:

| | Weight percent |
|---|---|
| In—198° F. (350° F. liquid temperature) | 61.85 |
| Bottoms | 38.15 |

The olefin conversion in this case was 32%.

The unconverted olefin from this run was subjected to the carbonylation reaction in the presence of a cobalt catalyst, and equimolar proportions of carbon monoxide and hydrogen at about 3000 pounds pressure and 350° F., and the product after hydrogenation was distilled and the octyl alcohol recovered.

Example III

The distillation bottoms from Examples I and II were composited and hydrogenated in an autoclave at 2800 p. s. i. g. hydrogen pressure at 350° F. for 12 hours over a nickel catalyst. The hydrogenated product was light yellow in color and had a hydroxyl number of 140. Distillation on the 25 mm. Pod. column at 5/1 reflux ratio led to the isolation of the following fractions:

| Fraction | Temperature, °F. | Weight, Percent |
|---|---|---|
| 1 | In-215 | 5.23 |
| 2 | 215-265 | 11.86 |
| 3 | 265-340 | 27.03 |
| 4 | 340-363 | 33.90 |
| 5 | Bottoms | 22.08 |

Example IV

The purpose of this example is to illustrate the thermal (non-catalytic) condensation of a $C_7$ olefin fraction isolated from a heptene polymer with formaldehyde.

In these experiments, samples of the olefin feed were contacted with anhydrous formaldehyde in shaker autoclaves at temperatures of 350°–400° F. in an inert atmosphere. The products which consisted of a single liquid phase were washed with 2% NaOH until the washings were strongly alkaline, washed with water and dried over anhydrous sodium sulfate. The products were distilled on a 12 inch Vigreaux column to separate an unconverted fraction of $C_7$ olefin and an oxygenated fraction consisting primarily of unsaturated alcohols and metadioxanes.

The unconverted olefin fractions were subjected to the Oxo synthesis by treating with synthesis gas in the shaker autoclave in the presence of a metallic cobalt catalyst, followed by hydrogenation over a nickel on kieselguhr catalyst. Oxo alcohols were recovered by conventional distillation.

Experimental data corresponding to such treating processes are given in the following table:

| Run No | 1 | 2 |
|---|---|---|
| Feed | [1] $C_7$ | [1] $C_7$ |
| Feed Weight, Gms | 715 | 715 |
| Formaldehyde, Gms | 304.5 | 302.0 |
| Treating Conditions: | | |
| Temperature, °F | 350 | 400 |
| Contact Time, Hrs | 20 | 20 |
| Pressure, p. s. i. g | | |
| Distillation of Product: | | |
| Unconverted Feed, Vol. Percent | 77.0 | 72.0 |
| Oxygenated Product | 21.0 | 22.0 |
| Bottoms (Condensation Products) | 1.0 | 6.0 |

[1] Fraction of UOP Polymer.

| Run No | 1 | | 2 | |
|---|---|---|---|---|
| Oxonation and Hydrogenation of Unconverted Feed: | Oxo | Hydro | Oxo | Hydro |
| Catalyst | Co Metal | Ni-Kieselguhr | Co Metal | Ni-Kieselguhr. |
| Cat. Conc. Wt. Percent | 0.23 | Ca. 20 | 0.21 | Ca. 20. |
| Temperature, °F | 350 | 350 | 350 | 350. |
| Contact Time, Hrs | 5 | 6 | 5 | 6. |
| Distillation of Product: | | | | |
| Unconverted, Wt. Percent | | 17.0 | | 17.8 |
| Intermediate | | 0.5 | | 0.5 |
| Alcohol | | 60.8 | | 57.2 |
| Bottoms | | 21.7 | | 24.5 |
| Comparative Yields of Useful Products: | | | | |
| Alcohols (Thermal Cond.) Wt. Percent of Total Product | | 23.4 | | 24.6 |
| Alcohol from Oxonation, Wt. Percent | | 42.1 | | 37.0 |
| Total Alcohol, Wt. Percent | | 65.5 | | 61.6 |

Many modifications of the invention may appear to those skilled in the art without departing from the spirit of the invention as described above. Thus, the condensation of formaldehyde with tertiary olefins may be carried out as desired, with acid catalyst or it may be carried out at elevated temperatures without catalysts.

What is claimed is:

1. An improved process for producing primary alcohols from an olefinic feed stock containing substantial amounts of tetra substituted tertiary olefins as well as less highly substituted tertiary, secondary and primary olefins which comprises reacting said feed stock with a compound selected from the class of formaldehyde and trioxymethylene, maintaining reaction conditions including temperatures less than about 80° F. and a residence time of from 5 to 20 hours, selectively reacting tetra-substituted tertiary olefins with said reagent and leaving substantially unchanged non-tetra-substituted tertiary olefins in said feed stock, whereby at least a substantial proportion of said tetra substituted olefins is converted into oxygenated products comprising metadioxanes and unsaturated alcohols, further converting said oxygenated products into saturated primary alcohols, passing said olefinic feed stock comprising tertiary, secondary and primary olefins but depleted in said tetra substituted olefins to a carbonylation zone wherein olefins are reacted with carbon monoxide and hydrogen at elevated temperatures and pressures in the presence of a cobalt carbonylation catalyst and converted to aldehydes, passing a reaction product comprising aldehydes from said last-named zone to a hydrogenation zone and recovering high yields of primary alcohols.

2. The process of claim 1 wherein condensation products resulting from said first-named reaction are separated from unreacted olefins.

3. The process of claim 2 wherein said condensation products are hydrogenated to produce primary alcohols.

4. The process of claim 3 wherein said condensation products are hydrogenated together with said aldehyde product in said hydrogenation zone.

5. The process of claim 1 wherein said feed stock is a heptene fraction.

6. An improved process for producing high yields of primary alcohols from an olefinic feed stock containing substantial amounts of tetra substituted tertiary olefins as well as less highly substituted tertiary, secondary and primary olefins which comprises reacting said feed stock with a compound selected from the group of formaldehyde and trioxymethylene at temperatures of less than about 80° F. and for a period of from about 5 to 20 hours, selectively converting said tetra-substituted tertiary olefins and leaving substantially unchanged non-tetra-substituted tertiary olefins contained in said feed stock, whereby at least a substantial proportion of said tetra substituted olefin is converted into oxygenated products comprising metadioxanes and unsaturated alcohols, passing said conversion product and unconverted olefins to a carbonylation zone wherein said material is contacted at elevated temperatures and pressures with hydrogen and carbon monoxide in the presence of cobalt carbonyl whereby olefins are converted into aldehydes containing one more carbon atom than said olefins, passing said aldehydes and said first-named conversion products to a hydrogenation zone and hydrogenating both said aldehydes and said conversion products into primary alcohols.

7. The process of claim 6 wherein said olefin feed comprises a heptene fraction containing about 20% of tetra alkyls substituted tertiary olefin.

8. The process of claim 6 wherein said carbonylation conditions comprise pressures of about 2500 to 3500 pounds and temperatures of about 300°–375° F.

JOSEPH K. MERTZWEILLER.

References Cited in the file of this patent

UNITED STATES PATENTS

| Number | Name | Date |
|---|---|---|
| 2,308,192 | Mikeska et al. | Jan. 12, 1943 |

OTHER REFERENCES

FIAT Final Report No. 1000, PB 81383 Dec. 26, 1947, pp. 14 and 15.

Wender et al., "Critical Review of Chemistry of Oxo Synthesis for Production of Alcohols from Olefins, Carbon Monoxide, and Hydrogen," Bureau of Mines, R. I. 4270, June 1948, 26 pages.